United States Patent
Henke et al.

[15] 3,651,743
[45] Mar. 28, 1972

[54] PNEUMATIC MEASURING DEVICE

[72] Inventors: Erich G. Henke, 7000 Stuttgart, Immenhofestr 19, Stuttgart; Helmut F. Braun, 7993 Kresbronn, Kirchstr 7; Karl L. Scholl, 7993 Kresbronn Argenstr 76, both of Kressbronn; Rudolf Schubert, 899 Lindau Obenietnauerstr 24, Lindau, all of Germany

[22] Filed: June 3, 1970

[21] Appl. No.: 43,017

[30] Foreign Application Priority Data

June 6, 1969 Germany .................. P 19 28 854.1

[52] U.S. Cl. ............................................................. 73/37
[51] Int. Cl. ........................................................ G01b 13/00
[58] Field of Search ........................... 73/37.5–37.7, 37.9

[56] References Cited

UNITED STATES PATENTS

| | | | |
|---|---|---|---|
| 3,438,244 | 4/1969 | Plumpe, Jr. | 73/37.9 |
| 2,402,293 | 6/1946 | Nye | 73/37.6 UX |
| 3,499,313 | 3/1970 | Eller | 73/37.7 |

*Primary Examiner*—Louis R. Prince
*Assistant Examiner*—William A. Henry, II
*Attorney*—Stevens, Davis, Miller & Mosher

[57] ABSTRACT

An apparatus which, at a remote position, will indicate the position of two parts which are shiftable relative to each other, such as parts located proximate to explosive means. This is accomplished by a device which is chargeable with compressed air, the relative movement of said parts reflecting itself in changes of the air pressure which changes, in turn, actuate an indicating means.

11 Claims, 11 Drawing Figures

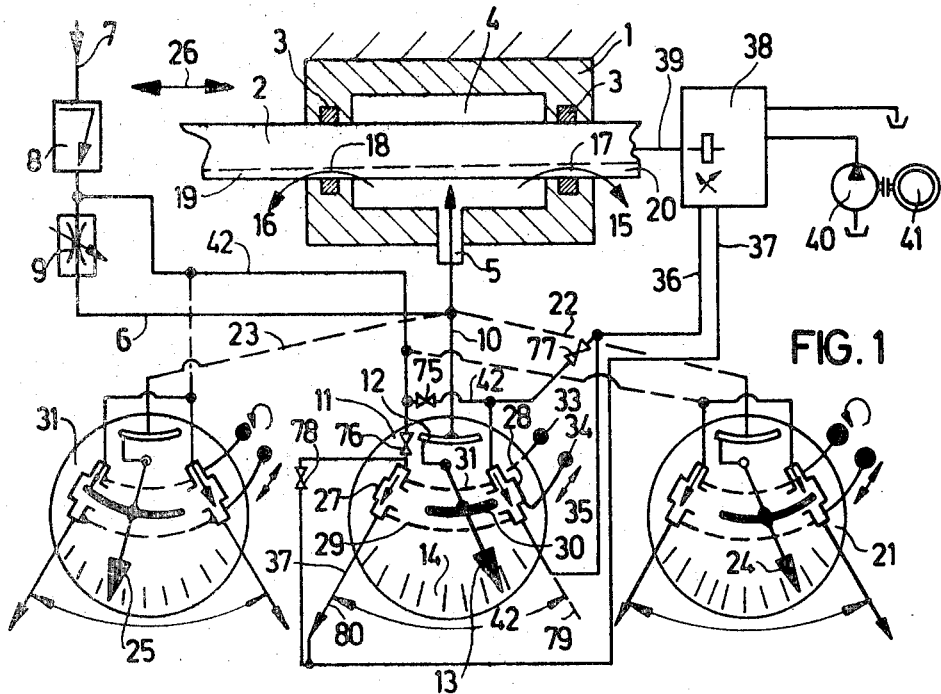
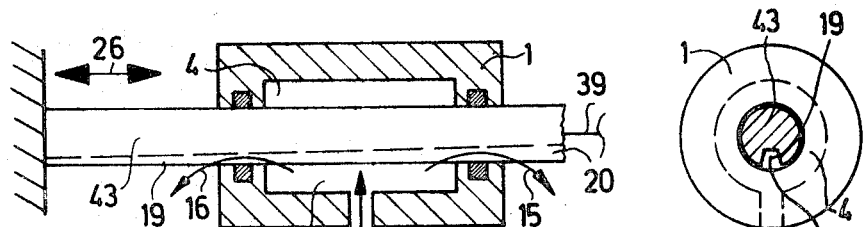
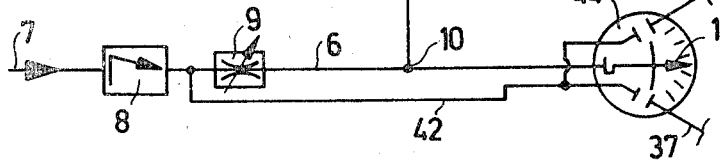
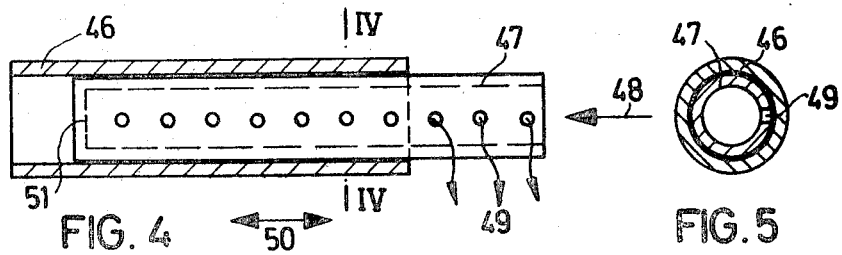

PNEUMATIC MEASURING DEVICE

The invention relates to a pneumatic measuring device which may serve for indicating and/or influencing the position of two parts shiftable relative to each other or for fixing the range of adjustment of the parts.

The prior art discloses electrical means for indicating or locating the position of two parts shiftable relative to each other, for example by scanning resistances. It is also known to perform this indication by magnetic means, for example by rotary digitizers.

Electrical devices of this type have the disadvantage that relatively extensive measuring instruments and transmitters are required which cannot be readily employed in explosion-endangered rooms.

Moreover, with known devices the shifting range or displacement is relatively restricted and greater shifting distances cannot be easily realized. Furthermore, when for example resistors which are tapped by brushes are used, inaccuracies due to contact difficulties occur.

The present invention eliminates the known disadvantages and it is an object of the invention to provide an indication and/or influencing device which makes it possible to effect the shifting of two parts and the indication of the position relative to each other with simple means, even in the case of longer shifting ranges. Another object of the invention is to provide a device which can be used in explosion-endangered rooms.

Another object of the invention is to provide a relatively simple device which can be manufactured at a reasonable price.

A still further object of the invention is to indicate not only the position of two parts which can be shifted relative to each other, but that influence is possible also on the part of the indication, the two parts shiftable relative to each other being controllable back and forth in a range that can be fixed.

It is also an object of the invention to suggest that several control programmes can be carried through by easy switching.

Another object is the provision that the invention can be designed in such a way that the entire plant including the control desk can be located in an explosion-endangered area without necessitating special explosion protective measures.

The invention solves the contemplated objects in such a way that a pneumatic measuring device is used which is so designed that a carrying part or support provided with at least one calibrated passage, extending over the covering length and located on the surface, and a supplementary part can be moved relative to each other and that a chamber forming between the passage and supplementary part can be loaded with compressed air provided, however, that measuring devices are present by means of which the change in the pressure of the compressed air occurring because of movement of the parts relative to each other can be measured.

The device according to the invention can also be used as a pneumatic device for measuring lengths including relatively large displacements which may also be curved.

The carrying part is preferably of rod design and slides in or out of the supplementary part as a tapping device.

The supplementary part can just as well be arranged movable relative to the carrying part.

In a special design the supplementary part can enclose the carrying part at least partly, it also being possible to design the supplementary part as a sleeve and allow it to slide on the carrying part.

The surface of the carrying part incorporates in the range of the covering length of the supplementary part at least one calibrated passage which is designed either as a groove or in the form of individual holes.

It can also be arranged in such a way that the carrying part and the supplementary part are designed as a dip tube unit provided, however, that the spacing and the dipping length have the effect of a passage.

Between carrying part and supplementary part several passages may be arranged along the covering length, said passages being associated with separate compressed-air-loaded chambers at the supplementary part and connected with measuring devices. Thus several programmes can be accommodated which can easily be engaged by switching between them.

According to the invention the measuring devices are so designed that the chamber can be loaded with compressed air of constant air pressure through a supply line in which there is, through a branch, a contact manometer with pneumatic tapping, indicating and/or converting into control impulses the differential pressure between the pressure of the compressed-air supply and the pressure at the passage.

The invention is schematically represented in several embodiments in the attached drawings. In the drawings:

FIG. 1 shows an embodiment in schematic representation with afixed supplementary part in the form of a sleeve, measuring device and drive.

FIG. 2 shows another embodiment similar to FIG. 1 with afixed carrying part and partly schematic representation of the measuring device.

FIG. 3 is a side view of the carrying part and supplementary part according to FIG. 2.

FIG. 4 shows an embodiment as a dip tube unit with holes.

FIG. 5 shows a side view of the embodiment according to FIG. 4.

Figure 6:
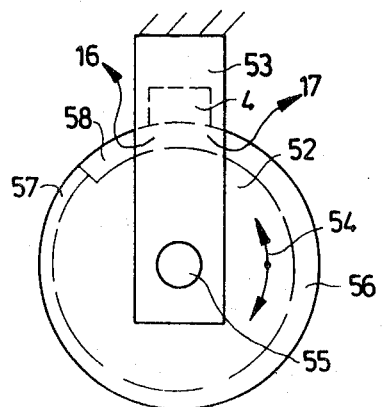
FIG. 6 is a top view of an embodiment with revolving carrying part and fixed supplementary part.

FIG. 1 shows a schematic representation of an embodiment with afixed supplementary part 1 in the form of a sleeve, in which a carrying part or support 2 can slide, which is sealed by stuffing boxes 3. Through hole 5, chamber 4 is supplied with compressed air from line 6 which is taken from a compressed-air supply unit by line 7. The compressed-air supply unit is not shown.

In the compressed-air supply line 7 a pressure stabilizer 8 is interposed which keeps the compressed air fed at a selectable constant value. Moreover, in the line 6 a preselectable setting valve 9 is arranged permitting preselection of the pressure in the line 6. Connected to the line 6 is a line 10 leading to the measuring device 11 where it is connected to a pressure gauge 12 which indicates the dynamic pressure by means of a pointer 13.

In chamber 4 a dynamic pressure builds up which is caused to develop a certain air volume flows from the pressure stabilizer 8 into chamber 4 through the setting valve 9. This air can escape into the atmosphere through the passages 17 and 18. The amount of dynamic pressure depends on the size of the passages 17 and 18.

It is evident from FIG. 1 that passage 19 has a smaller cross section at the left-hand side than at the right-hand side 10. The passage is designed as a longitudinal groove increasing in cross section. In this way a definite dynamic pressure is assigned to each position of the carrying part 2 relative to the supplementary part 1. It can easily be recognized that scale 14 in the measuring device 11 can be calibrated not only in pressure graduations, but also in position markings which result between the carrying part 2 and the supplementary part 1.

It is still to be explained in what manner the measuring device 11 normally cooperates with the supplementary part 1 and the carrying part 2. The measuring device 11 is so represented that pointer 13 is just about to come to its right-hand end position.

The measuring devices 21 and 31 also drawn in are in outline connected to the line 6 by means of the dashed lines 23 and 22 in order to demonstrate how the measuring devices 21 and 31 operate in the respective end positions. The measuring device 21 is in the right-hand end position with pointer 24, while in the case of measuring device 31 the pointer 25 is in the left-hand end position.

The carrying part 2 can move back and forth in the chamber 4 in the direction of the arrow 26. The function of this movement is controlled by the measuring device 11. Moreover, the length and the location of the stroke of the carrying part 2 relative to the supplementary part 1 can be set from the measuring device 11.

On a carrier 29 in the measuring device 11 nozzle valves 27 and 28 are arranged which are commonly supplied with compressed air from the pressure stabilizer 8 through a line 42.

The nozzle valves 27 and 28 with the holder 29 can be moved on their arc path relative to the pointer 13 by means of handle 34 so that, with its control vane 30, the pointer 13 can act upon the compressed-air path of the nozzle valve 27 or 28 on the one side or the other. In this way the control vane 30 can interrupt or reduce the air current in the nozzle valve 27 and 28, respectively.

Thus the movement range of the carrying part 2 can be shifted either farther in the direction of arrow 26 to the left or to the right.

Moreover with the measuring device 11 which can also be described as a contact manometer with pneumatic tapping, it is also possible to set the range, in which the carrying part 2 moves back and forth, narrower or wider in that the nozzle valves 27 and 28 which are arranged on the carrier 29 are adjustable relative to each other in the angle 42 by a spindle 31 through handle 33. When a smaller angle is set, the range in which the carrier 2 runs back and forth in relation to the supplementary part 1 becomes smaller, whereas with a larger angle the range covered becomes wider. It is, of course, also possible to proceed in such a way that the nozzle valves 27 and 28 are commonly seated on a spindle which has a right-hand thread on the one side and a left-hand thread on the other side so that, when adjusting at handle 33, the angle 42 is symmetrically adjustable to a centre line. It is, however, also possible to proceed in such a way that two separate adjusting handles are provided, a separate adjusting lever being arranged at each nozzle valve 27 and 28, so that the sides of the angle are separately adjustable relative to the centre line with the consequence that the adjusting range of the carrying part 2 can also be reduced or extended, but that at the same time a shifting of the adjusting range can take place.

The measuring device is preferably accommodated in a control desk which can also house the other supply equipment.

The further function of the measuring and influencing device 11 is explained in the following. The compressed air from line 42 which is taken out at the pressure stabilizer 8, flows through the nozzle valves 27 and 28 via lines 36 and 37 to a drive unit 38, not described in more detail, which is driven by a hydraulic pump 40, for example, and an electric motor 41. The drive unit is connected to the carrying part 2 through coupling 39 and controls this in the direction of arrow 26 in dependence on the differential pressure which develops in the chamber 4.

The drive can be hydraulic or pneumatic. But a mixed hydraulic-pneumatic drive can be used just as well. In explosion-endangered rooms only a hydraulic or combined hydraulic-pneumatic drive should be selected for practical reasons and further electric means should be dispensed with.

It is evident what will happen when pointer 25 in the measuring device 31 arrives at its extreme left-hand position. The compressed air is interrupted in the nozzle valve 27 with the result in the drive unit 38 that the carrying part 2 returns in reverse direction.

With the position of the pointer 24 at the right-hand side, on the other hand, a reversal of the direction of movement of the carrying part 2 in the drive unit will be effected, as shown by the measuring device 21.

FIG. 2 shows another embodiment, similar to FIG. 1, with fixed carrying part 43 and partly schematic representation of the measuring device 44. The supplementary part 1 slides on the carrying part 43. The rest of the reference numbers corresponds to the method of operation according to FIG. 1.

FIG. 3 shows a side view of the carrying part 43 and the supplementary part 1 according to FIG. 2. It is apparent how compressed air can escape from the calibrated passage 19 in the direction of arrow 45, so that a dynamic pressure builds up in the chamber 4 as already described above.

FIG. 4 illustrates another modification which is to be described as a dip tube unit. For example, a tube section into which immerses a supplementary part or sleeve 47 as tube section which is closed at the lower end at 51, can act as carrying part or support 46. In the direction of arrow 48 the supplementary part 47 is loaded with compressed air, similar to the supplementary part 1 in FIG. 1 through the hole 5. The compressed air flowing in can now escape from the holes 49 in the supplementary part 47 according to the relative position between the carrying part 46 and the supplementary part 47 so that again, as in the embodiment according to FIG. 1, a differential pressure develops which can be indicated in a measuring device or can be used for control purposes.

FIG. 5 shows a section through the embodiment according to FIG. 4 along line IV—IV in FIG. 4, the method of operation of the individual parts being the same as in FIG. 4 and also the same reference numbers being provided.

FIG. 6 is a top view of an embodiment with revolving carrying part 52 and fixed supplementary part 53. In the supplementary part 53 a chamber 4 is arranged which cooperates with a passage groove 56 which, similar to FIG. 1, extends from a wider cross section 58 to a smaller cross section 57 as indicated by the dashed line. It can be recognized, when also referring to FIG. 7, that through a hole 5 compressed air can flow into the chamber 4 and can escape through the passage slots at 16 and 17 so that, exactly as in the example according to FIG. 1, a differential pressure can develop depending on the point of location of the carrying part 56 in the direction of arrow 54. The carrying part 56 is with its axle 55 supported in the supplementary part 53.

Figure 7:
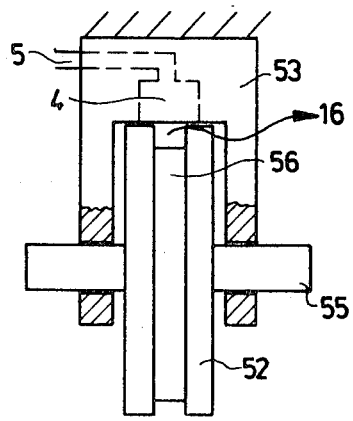
FIG. 7 is a side view, partly in section, of the design according to FIG. 6.

FIG. 7 shows a side view, partly in section, of the design according to FIG. 6 and provided with the same reference numbers as in FIG. 6.

This design is also intended for a rotary motion of the carrying part 52.

Figure 8:
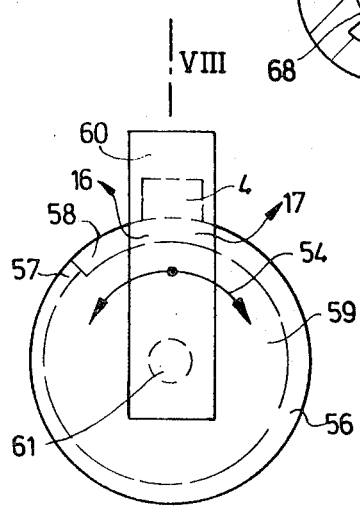
FIG. 8 shows an embodiment with fixed carrying part and revolving supplementary part.
Figure 9:
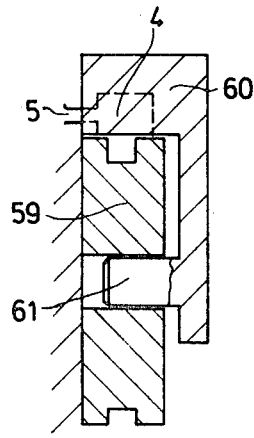
FIG. 9 is a sectional view of the design according to FIG. 8 along line VIII—VIII.

FIGS. 8 and 9 show another modification with the carrying part 59 fixed, in which on pivot 61 a supplementary part 60 is arranged capable of revolving in the direction of arrow 54 which can run down over the passage groove 58. Regarding the differential pressure the method of operation is the same as described in the example of FIG. 4.

Figure 10:
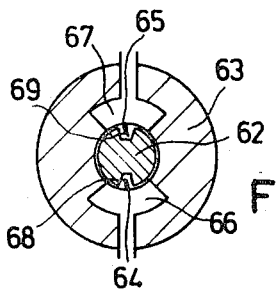
FIG. 10 is a sectional view of a carrying part with supplementary part in the form of a sleeve provided with several chamber and associated passages, similar to the design according to FIGS. 1 and 2.

FIG. 10 shows a carrying part 62 with supplementary part 63 in the form of a sleeve equipped with several room sections 66 and 67 which are loaded with compressed air through holes 64 and 65 and on which compressed air can escape through the passages 68 and 69 in the same manner as described in the example according to FIG. 1, so that in the chambers 66 and 67 a pressure differential develops which can be measured through measuring devices and utilized for control purposes.

According to the example of FIG. 10 a double influence between carrying part 62 and supplementary part 63 can be arranged over distances or also collateral.

It is also possible that over distances the passage 68 or 69 or according to the example of FIG. 1 the passage 19–20 is closed so that a pressure peak occurs which can be utilized separately for controlling processes through special measuring devices.

It is, of course, also possible to go one step further and arrange several chambers producing a pressure differential only at particular places which can be utilized for control purposes.

Figure 11:
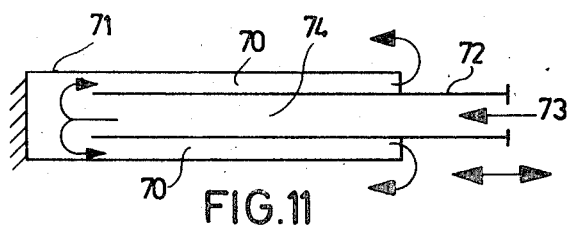
FIG. 11 shows an embodiment as a dip tube unit similar to FIGS. 4 and 5 and having instead of the holes the fit gap between carrying part and supplementary part serve as passage.

FIG. 11 shows a representation of an embodiment as a dip tube unit similar to FIGS. 4 and 5, in which instead of the holes 49 according to FIG. 4, the fit gap 70 between the carrying part 71 and the supplementary part 72 serves as passage. The unit is loaded with compressed air in the direction of arrow 73 in the same manner as in FIG. 1. Depending on the extent to which the supplementary part 72 immerses in the carrying part 71, the pressure differential in chamber 74 will be obtained which can then be measured through a measuring device.

In the FIGS. 4, 6, 8, 11, the method of operation corresponds to that described for FIG. 1, wherein the lines 6 and 10 are connected to line 5 and/or 73, compressed air being supplied at line 6 and at line 10, and a measuring device, for example, being installed which has the same method of operation as shown in FIG. 1.

A summarized description of the cycle of movements shall be given in the following. The cycle of movements can be obtained in such a way that according to FIG. 1 the carrying part swings back and forth in a preset range, angle 42. By means of additional valves 75, 76 in the lines in front of the nozzle valves 27, 28, it is also possible to act upon the cycle of movements and to reduce the range either by hand or from another transmitter. Moreover, parallel to the nozzle valves 27, 28, the stroke range can be extended at will on one side or the other through valves 77, 78.

By adjusting the slide, on which the nozzle valves 27, 28 are arranged, to the right or to the left, the stroke range which can be fixed by the angular dimension, can be shifted as a whole.

Moreover, the nozzle valves 27, 28 can on the hand be adjustable in the angle 42 through a common spindle 31 with right-hand and left-hand thread by knob 33.

It is, however, also possible to provide a separate adjusting spindle with separate adjusting knob for each nozzle valve 27 and 28, so that each angle side 79, 80 can be shifted separately. Adjustment can be made by hand or alternatively by another transmitter so that programme control is possible.

The device on the one hand can be used for merely indicating the position of two parts, the carrying part and the supplementary part, relative to each other.

On the the other hand the device can also be used for controlling the movement of two parts, the carrying part and the supplementary part, relative to each other, that means that at least one of the parts is moved by driving means and that the respective position relative to each other can be read.

According to FIG. 10 passage 69 can be used for control and passage 68 for measurement, in this way it is possible, for example, to apply relatively steep pressure rises in the case of the control at the end points and/or reversing points and thus to counteract the inertia of the measuring device.

Moreover, the second or third passage can also serve the purpose of releasing further functions. This can be effected in such a way that, for example, only individual separate passages in the form of groove pieces exist also at uniform intervals which release impulses at the control desk which can also be utilized as counting impulses, for example binary.

What is claimed is:

1. A pneumatic measuring device comprising
   a. a support, said support being provided with at least one groove in its surface, said groove having a non-uniform cross section to form a calibrated passage,
   b. a sleeve positioned with respect to said support to form a chamber having an opening at each end defined by said non-uniform groove, said sleeve and said support being movable relative to each other,
   c. means for supplying compressed air to said chamber, and
   d. means for measuring the pressure in said chamber, the pressure in said chamber being a measure of the relative position of said support and said sleeve and being determined by the cross sections of said groove at each of said openings, said cross sections corresponding to the relative position of said support and said sleeve.

2. A pneumatic measuring device as defined by claim 1 wherein said sleeve is fixed and said support is slidably movable within said sleeve.

3. A pneumatic measuring device as defined by claim 1 wherein said support is fixed and said sleeve is movable with respect to said support.

4. A pneumatic measuring device as defined by claim 1 wherein said sleeve at least partially surrounds said support.

5. A pneumatic measuring device as defined by claim 1 wherein the cross section of said groove changes substantially uniformly along said support.

6. A pneumatic measuring device as defined by claim 1 wherein the support and the sleeve comprise a dip tube unit, the spacing between said support and said sleeve and the dipping length having the effect of a passage.

7. A pneumatic measuring device as defined by claim 1 wherein between the support and the sleeve several passages are arranged along the covering length, said passages being associated with separate compressed-air-loaded chambers and connected to measuring devices.

8. A pneumatic measuring device as defined by claim 1 wherein said grooves are longer than said sleeve.

9. A pneumatic measuring device as defined by claim 1 wherein measuring means are coupled to said chamber for indicating the dynamic pressure therein or converting it into control impulses.

10. A pneumatic measuring device as defined by claim 1 wherein said measuring device further comprises a contact manometer with pneumatic tapping, the dynamic pressure in said manometer being coupled to a pressure gauge actuating a pointer, control vanes attached to said pointer, and nozzle valves actuated by said pointer for controlling drive units.

11. A pneumatic dip tube unit comprising
    a. a cylindrical hollow support,
    b. a hollow sleeve having a plurality of apertures along its longitudinal axis and closed at one end, said sleeve being slidable inserted in said hollow support,
    c. means for supplying compressed air to the inside of said sleeve, and
    d. means for measuring the pressure of the air flowing from the apertures in said sleeve external to said hollow support, said pressure corresponding to the position of said hollow sleeve.

* * * * *